United States Patent [19]

Donegan et al.

[11] Patent Number: 5,468,011

[45] Date of Patent: Nov. 21, 1995

[54] SIMPLIFIED AIR BAG MODULE

[75] Inventors: Michael W. Donegan, Bellbrook; Richard P. Nuchols, Loveland; James L. Webber, Spring Valley; Jerry A. Mc Cann, Miamisburg, all of Ohio

[73] Assignee: General Motors Corporation, Detroit, Mich.

[21] Appl. No.: 206,244

[22] Filed: Mar. 9, 1994

Related U.S. Application Data

[63] Continuation of Ser. No. 897,118, Jun. 11, 1992, abandoned.

[51] Int. Cl.⁶ ................................................. B60R 21/20
[52] U.S. Cl. .................................. 280/728.2; 280/732
[58] Field of Search ...................... 280/728 A, 728 R, 280/730, 732, 741; 403/349, 348, 315, 316, 363; 220/346; 383/68, 69

[56] References Cited

U.S. PATENT DOCUMENTS

| | | | |
|---|---|---|---|
| 1,033,187 | 7/1912 | Metzger | 403/349 |
| 1,131,399 | 3/1915 | McGinley | 403/349 |
| 2,307,385 | 1/1943 | Braxton | 403/349 |
| 3,082,985 | 3/1963 | Herdman | 403/348 |
| 3,708,181 | 1/1973 | Mazelsky | 280/740 |
| 3,778,085 | 12/1973 | Lipkin | 280/734 |
| 4,191,392 | 3/1980 | Barnett | 280/740 |
| 4,332,398 | 6/1982 | Smith | 280/732 |
| 4,941,678 | 7/1990 | Lauritzen et al. | 280/732 |
| 4,986,569 | 1/1991 | Bruton | 280/743 |
| 5,058,919 | 10/1991 | Paquette et al. | 280/728 A |
| 5,062,664 | 11/1991 | Bishop et al. | 280/732 |
| 5,069,480 | 12/1991 | Good | 280/743 |
| 5,248,162 | 9/1993 | Levosinski | 280/740 |
| 5,346,248 | 9/1994 | Rhein et al. | 280/728 R |

FOREIGN PATENT DOCUMENTS

| | | | |
|---|---|---|---|
| 3-70648 | 3/1991 | Japan | 280/728 |

*Primary Examiner*—Karin L. Tyson
*Attorney, Agent, or Firm*—Charles E. Leahy

[57] ABSTRACT

An air bag module comprises an inflatable air bag, an inflator and a container for housing the inflator and the air bag. The container comprises an elongated reaction canister having a closed housing formed of a U-shaped body with end walls defining a rectangular top gas discharge opening. An air bag deployment chute comprises a rectangular body having a bottom gas transfer opening mating with the canister opening and a top air bag deployment opening. Cooperating flanges on the top side of the canister and on the bottom side of the chute are interengageable upon endwise sliding to assemble the chute to the canister. Surfaces on the chute and canister engage to locate the chute bottom opening in registry with the canister opening. Cooperating tabs on the canister are received in slots formed in the chute upon assembly and are deformed to lock the chute to the canister. The air bag is attached via loops to two rods which are received in closed channels formed by the cooperating flanges to secure the air bag to the module. Surfaces on the chute and canister engage to prevent endwise rod removal. The inflator has a pair of mounting lugs extending from one end and a single lug at the other end. These lugs may be formed on adapter end caps. The lugs are inserted into grooves in the canister end walls and are slid or rotated past spring barriers into mounting apertures where they are retained against removal.

9 Claims, 10 Drawing Sheets

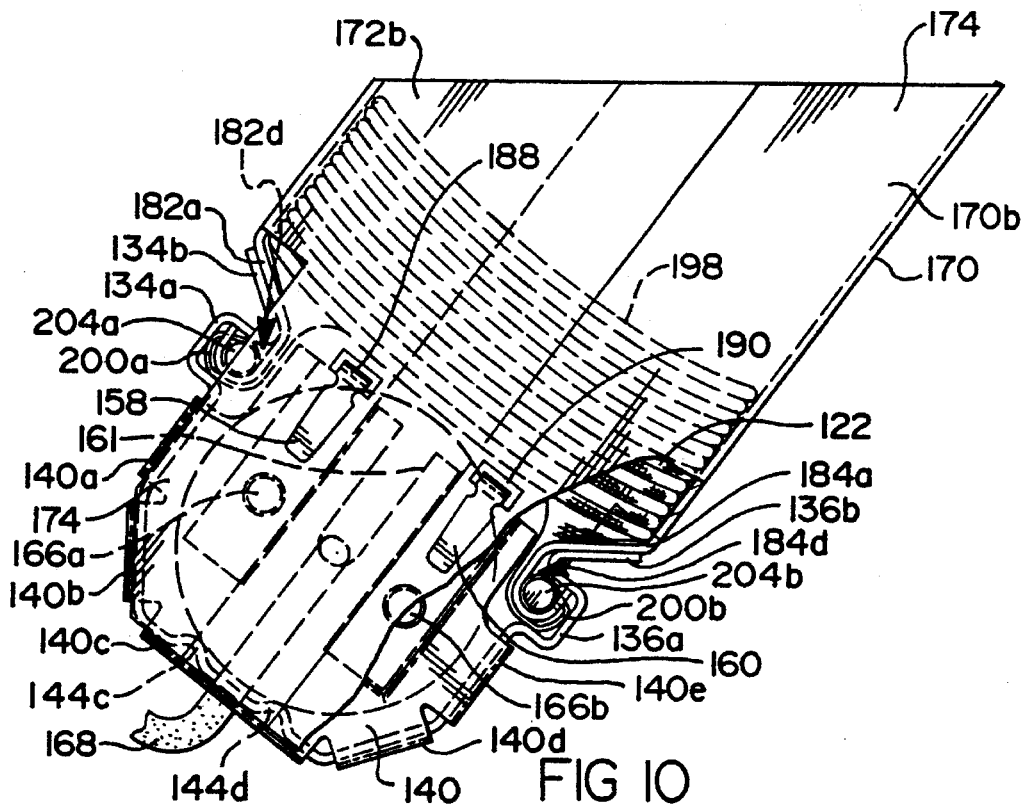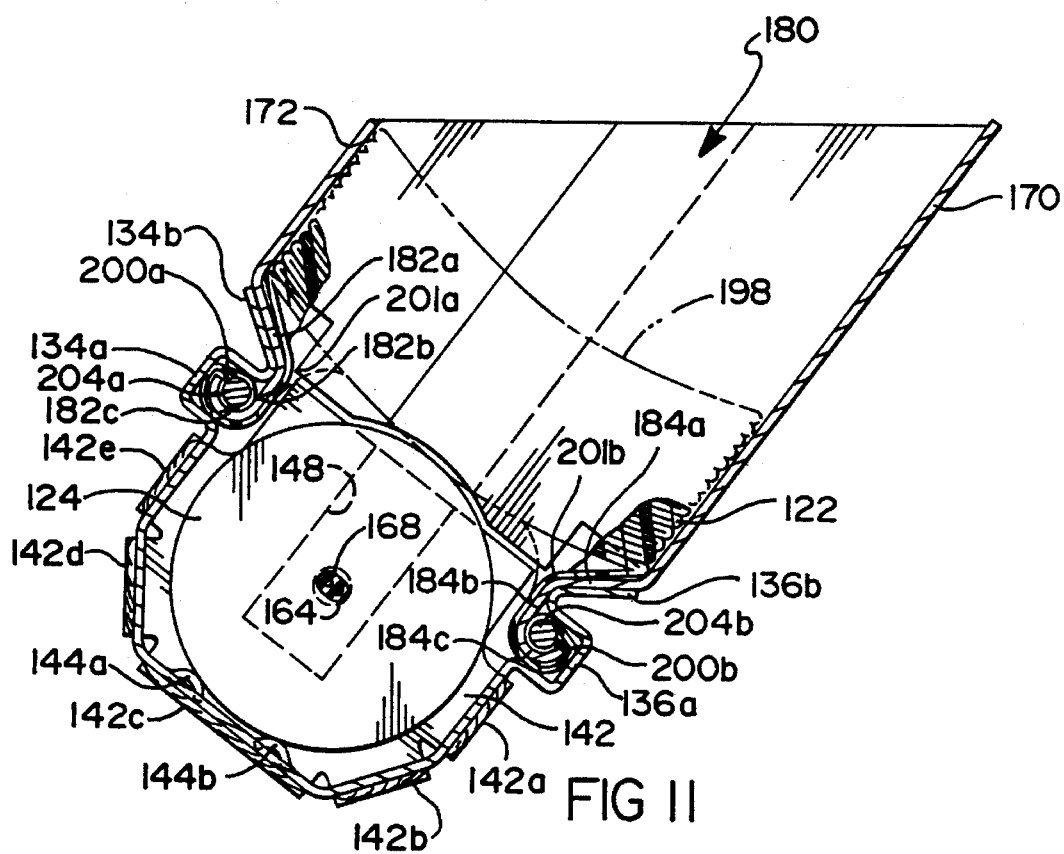

SIMPLIFIED AIR BAG MODULE

This is a continuation of application Ser. No. 07/897,118, filed on 11 Jun. 1992, now abandoned.

BACKGROUND OF THE INVENTION

This invention relates generally to inflatable restraint systems for passenger vehicles and, more particularly, to an air bag module having simplified construction.

Inflatable occupant restraint systems for passengers of vehicles conventionally comprise an air bag assembly having an inflatable air bag, an inflator and a housing for the inflator and the air bag. This assembly is mounted in a recess in the instrument panel for deployment of the air bag through a panel opening. The instrument panel opening can be located in the front face of the instrument panel or in the upper surface of the panel. This opening is conventionally closed by a cover door.

The air bag assembly housing has a reaction canister lower portion and an upper discharge chute portion for the air bag which terminates at the instrument panel deployment opening. In some assemblies, the canister, inflator and air bag are all mounted together with a plurality of rivets. In other, the inflator is mounted to the canister separately from the air bag. Conventional air bag assemblies are unduly complex and require a multiplicity of fasteners to assemble.

Different vehicles have different instrument panel shapes and structures, which dictate different placements for the air bag assemblies. Thus, conventionally, the air bag housing portions must vary in shape, depending on the location of the air bag assembly relative to the instrument panel housing. This requires that the housing shape be tailored to the particular installation, since locations will vary from vehicle to vehicle. As a result, each air bag assembly is unique.

It would be desirable to provide an air bag assembly that has a simplified construction which eliminates the use of the multiplicity of conventional fasteners previously needed.

It would also be desirable to provide a simplified mounting of an air bag to a reaction canister which eliminates the use of conventional fasteners.

It would also be desirable to provide a simplified mounting of an inflator to a reaction canister which eliminates the use of conventional fasteners.

SUMMARY OF THE INVENTION

It is therefore an object of this invention to provide an air bag assembly that has a simplified construction which eliminates the use of the multiplicity of conventional fasteners previously needed.

It is another object of this invention to provide a simplified mounting of an air bag to a reaction canister which eliminates the use of conventional fasteners.

It is a further object of this invention to provide a simplified mounting of an inflator to a reaction canister which eliminates the use of conventional fasteners.

Accordingly, in one aspect, this invention features an air bag module comprising an inflatable air bag, an inflator therefor, and a container for housing the inflator and the air bag. The container comprises a reaction canister and an attached air bag deployment chute. The elongated reaction canister has a closed housing with a rectangular top gas discharge opening and includes inflator mounting means for mounting the inflator. The air bag deployment chute comprises a rectangular body having a bottom gas transfer opening mating with the canister opening and a top bag deployment opening. Cooperating flanges on the canister and on the chute are interengageable upon assembly to secure the chute to the canister. Locating means are provided for locating the chute bottom opening in registry with the canister opening upon said assembly. Locking means on the canister and chute prevent disassembly of the chute and canister.

More specifically, the reaction canister is elongated and has a closed housing formed of a U-shaped body with end walls defining a rectangular top gas discharge opening. The air bag deployment chute comprises a rectangular body having a bottom gas transfer opening mating with the canister opening and a top bag deployment opening. The cooperating flanges are located on the top side of the canister and on the bottom side of the chute and are interengageable upon endwise sliding to assemble the chute to the canister.

In another aspect, this invention features mounting means for mounting an air bag adjacent the gas discharge opening of a reaction canister in fluid communication with an inflator mounted in the canister. The mounting means comprise a channel in the canister, a rod received in the channel, means for attaching the air bag to the rod, and means for locking the rod in the channel to mount the air bag to the canister.

More specifically, a pair of elongated rods are provided, and a pair of elongated channels are formed on opposite sides of the canister gas discharge opening having open ends for receiving the rods. The air bag is attached to each rod, and the locking means are operable to prevent endwise removal of the rods from the channels.

Preferably, the air bag includes loops engaging the rods along their lengths and the grooves are sized to slidingly receive the rods and air bag loops. The grooves include longitudinal gaps having a dimension permitting the passage of air bag material therethrough while retaining the rods and loops therein.

In yet another aspect, this invention features mounting means for mounting an air bag inflator to a reaction canister having side walls and end walls which define a gas discharge opening. A pair of spaced mounting lugs extend from one end of the inflator, and a mounting lug extends from the other end of the inflator. A mounting aperture is formed in one end wall, and a pair of spaced mounting apertures are formed in the other end wall. Grooves are formed in the end walls extending from the gas discharge opening to the apertures for channeling the mounting lugs into the mounting apertures.

In one embodiment, the end wall grooves are cut through the end walls to allow passage of the mounting lugs therethrough. The one end wall groove includes a main portion intersected by two spaced arcuate portions which receive the mounting lugs upon rotation of the inflator, following lug insertion into the groove main portion, and direct the mounting lugs into the apertures. The mounting lug extending from said other end of the inflator and the mounting aperture and groove in said other end wall are sized to permit insertion of the lug through the groove into the mounting aperture, but prevent subsequent removal of the lug through the groove after inflator rotation.

Preferably, the one end wall includes a spring finger adjacent each aperture for permitting movement of a lug into the aperture, but preventing removal therefrom to prevent reverse rotation of the inflator.

In another embodiment, the end walls adjacent the apertures are spaced apart a distance less than the distance between the ends of the inflator lugs. The end wall grooves taper inwardly from the gas discharge opening to the apertures, and the end walls are sufficiently resilient to enable passage of the lugs through the grooves into the apertures, where they are locked against removal.

In still another aspect, this invention features apparatus for mounting one end of a cylindrical air bag inflator to a reaction canister having at least one end wall aperture for receiving a mounting lug comprising end caps for the inflator. One end cap has a cylindrical portion for gripping a portion of the outer surface at one end of the inflator, an end plate closing the end of the cylindrical portion, and a mounting lug extending outwardly of the end plate. The end cap provided for mounting the other end of the inflator to the canister has an end plate which includes a central opening for the passage of inflator wiring therethrough and a pair of said mounting lugs flanking said opening. In one embodiment, the end plate includes a radial slot extending outwardly from the central opening through the cylindrical portion.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 10 is an end view of the air bag module, looking in the direction of arrows 10—10 of FIG. 9;

FIG. 11 is a sectional view, taken along line 11—11 of FIG. 9;

DETAILED DESCRIPTION OF A PREFERRED EMBODIMENT

Figure 1:
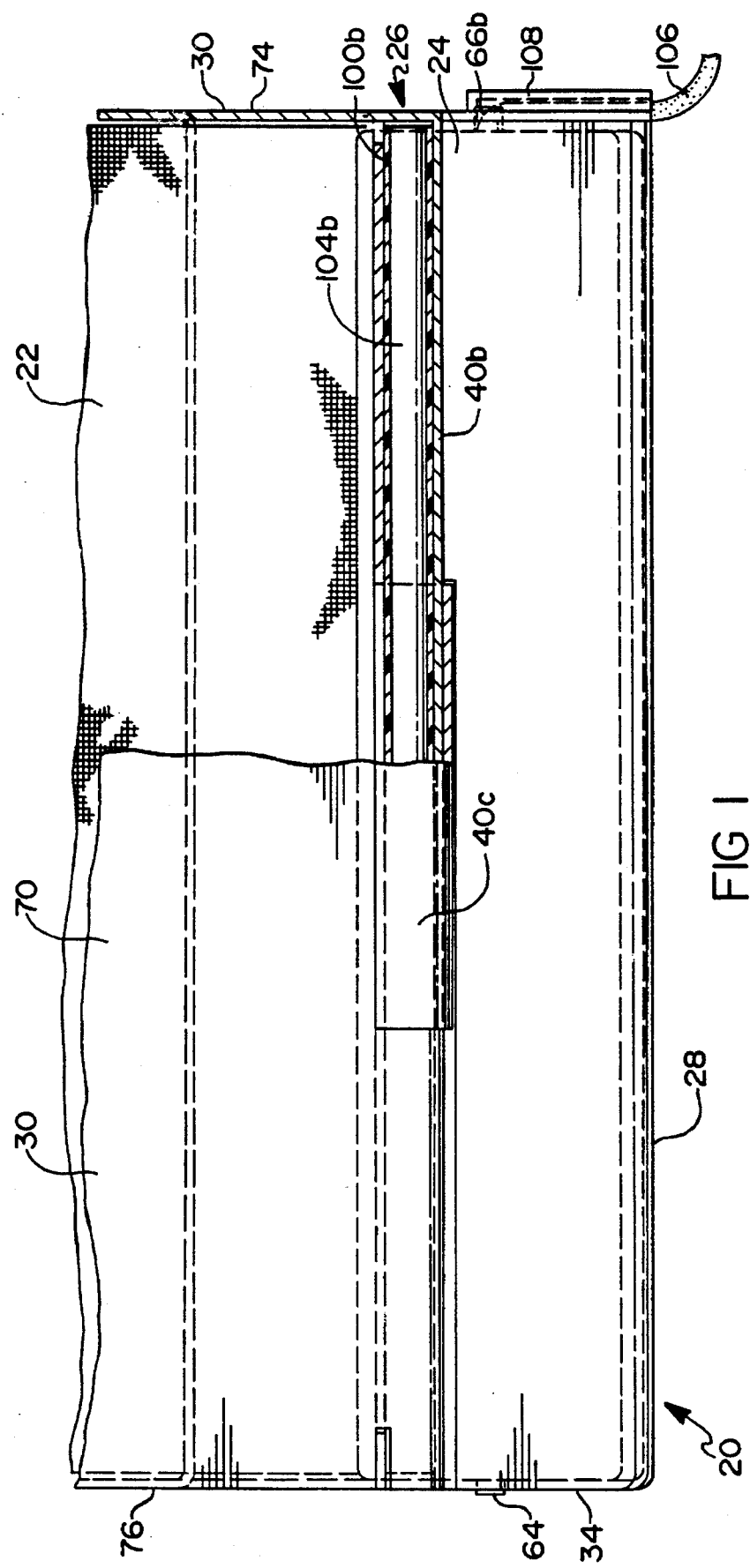
FIG. 1 is a front view of one embodiment of an air bag module according to this invention, partially broken away to show details of construction.

Referring now to FIGS. 1–7, a preferred embodiment of an air bag module 20 comprises an air bag 22 and an inflator 24 which are housed in a container 26. A separate reaction canister 28 and a deployment chute 30 are assembled together to form container 26.

The canister 28 comprises an elongated U-shaped body 32 closed at the ends by integral end plates 34 and 36, which define an upper rectangular gas discharge opening 38. Flanking the sides of opening 38 are flat flange segments 40a, 40b and 42a, 42b and by curved flange segments 40c and 42c spaced below. As shown in FIGS. 3–7, the flange segments 40a, 40b and 40c form an enclosed elongated channel 40d, while segments 42a, 42b and 42c form a similar channel 42d. Body 32 can be made of plastic, cast metal or stamped steel.

Figure 3:
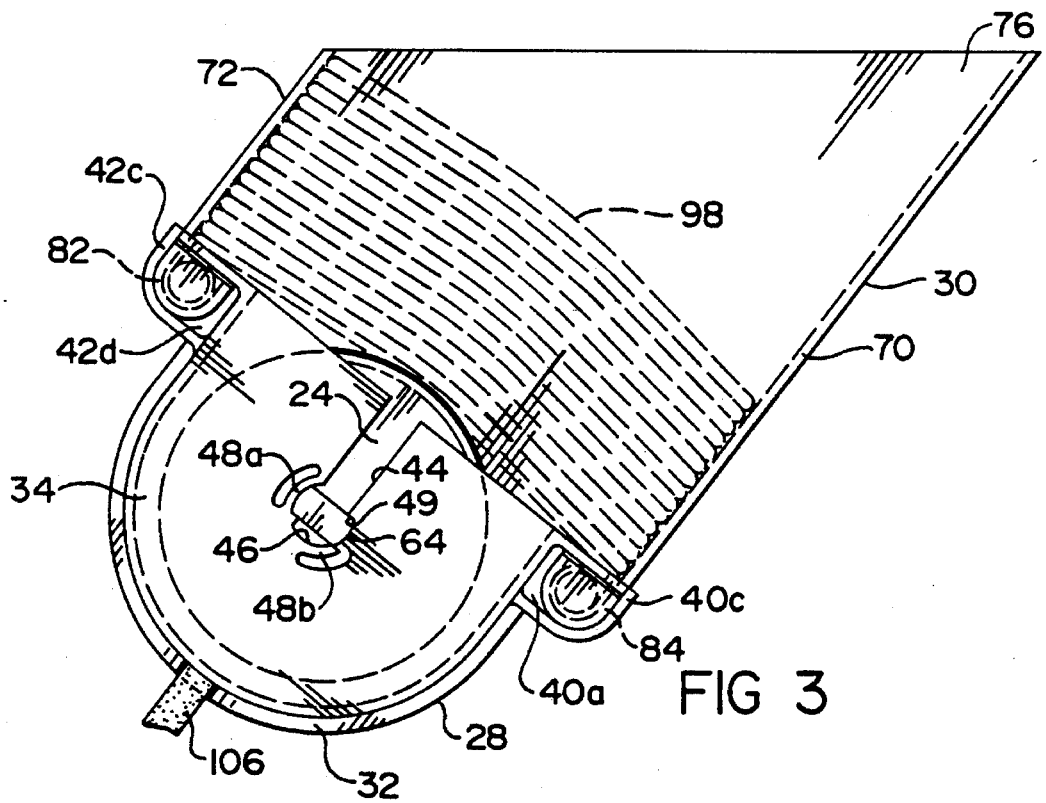
FIG. 3 is an end view of the air bag module, looking in the direction of arrows 3—3 of FIG. 2.
Figure 4:
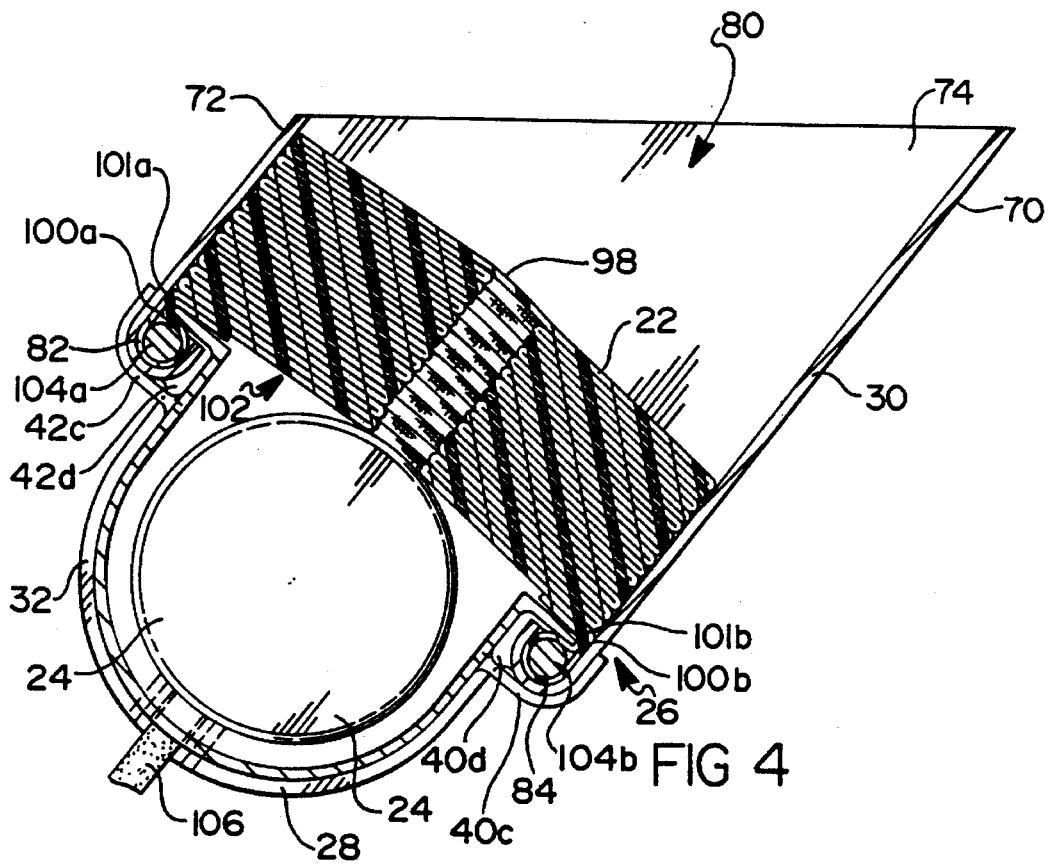
FIG. 4 is a sectional view, taken along line 4—4 of FIG. 2.
Figure 5:
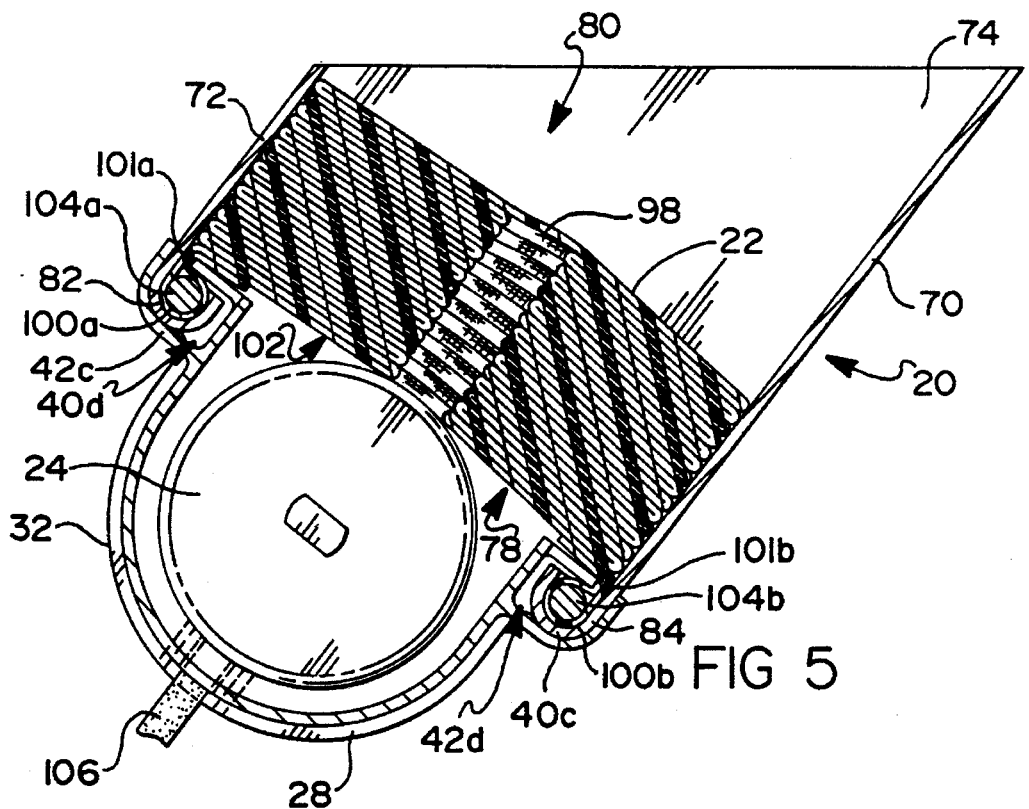
FIG. 5 is a sectional view, taken along line 5—5 of FIG. 2.
Figure 6:
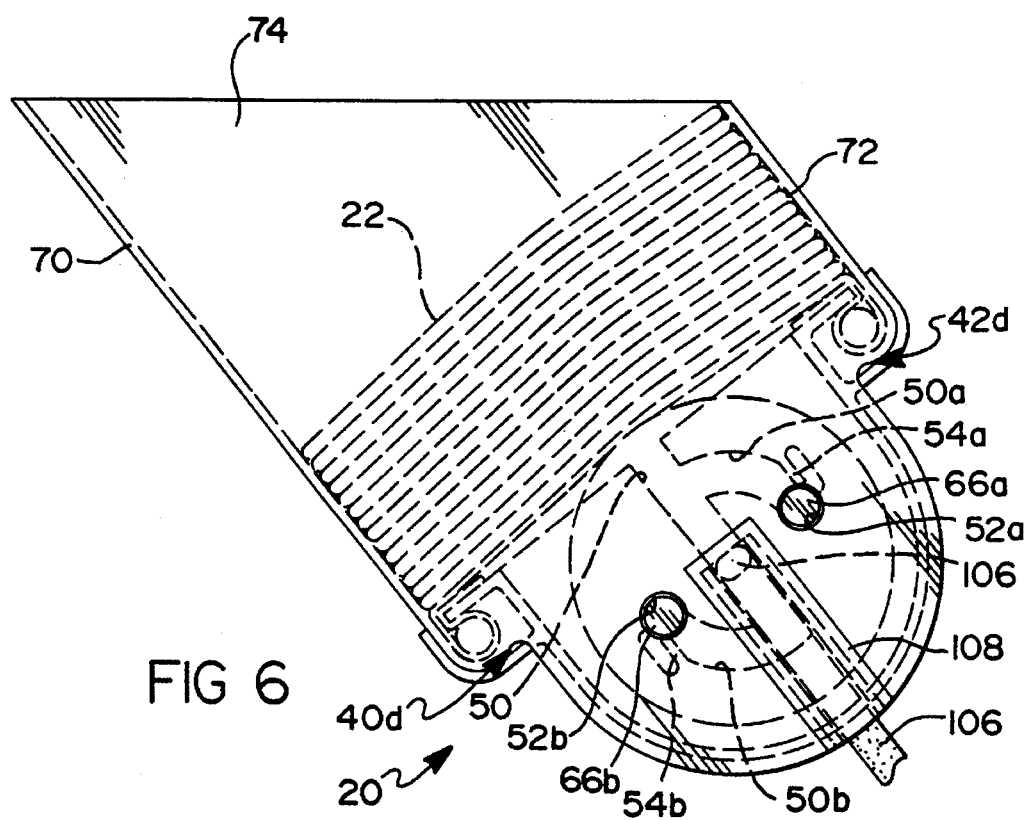
FIG. 6 is an end view of the air bag module, looking in the direction of arrows 6—6 of FIG. 2.

As shown in FIG. 3, end plate 34 includes a vertical groove 44 that connects to a lug-mounting aperture 46. The aperture is defined by spring fingers 48a, 48b and locating shoulders 49a, 49b. As shown in FIG. 6, end plate 36 includes a vertical groove 50 that has arcuate branches 50a and 50b which enter into lug-mounting apertures 52a, 52b that partially blocked by spring fingers 54a, 54b.

Figure 2:
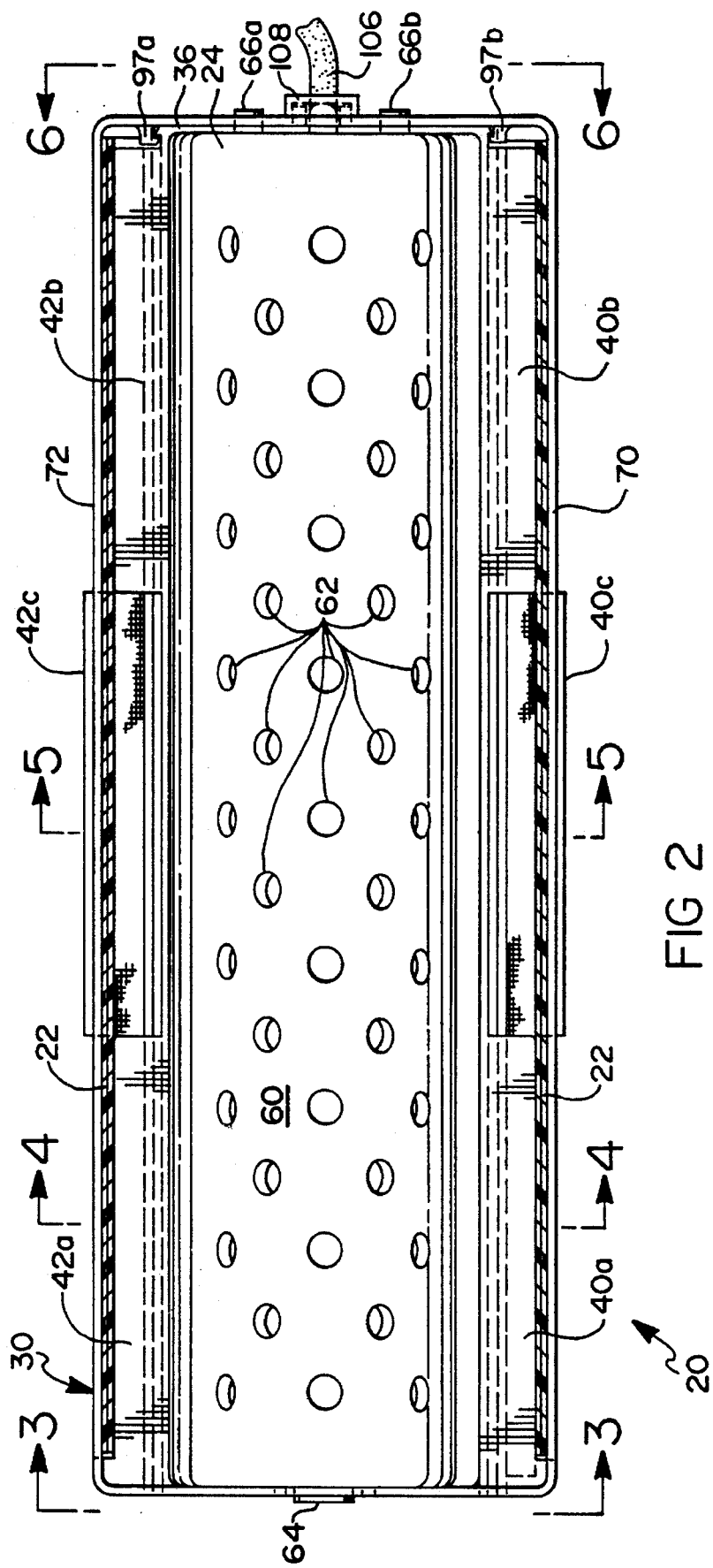
FIG. 2 is a plan view of the air bag module of FIG. 1.
Figure 7:
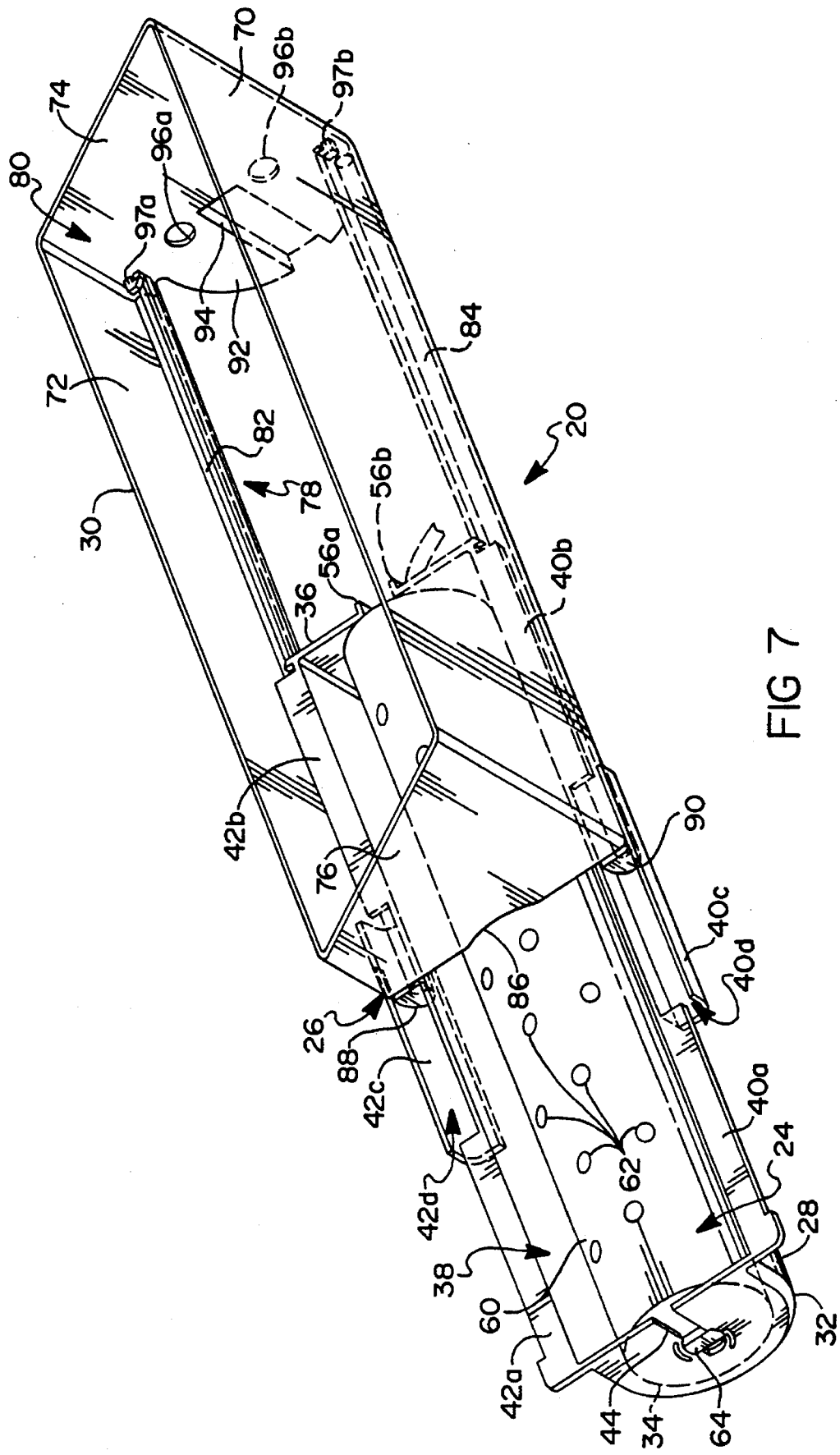
FIG. 7 is a perspective view of the embodiment of FIGS. 1–6, shown during assembly of the air bag deployment chute to the inflator reaction canister.
Figure 8:
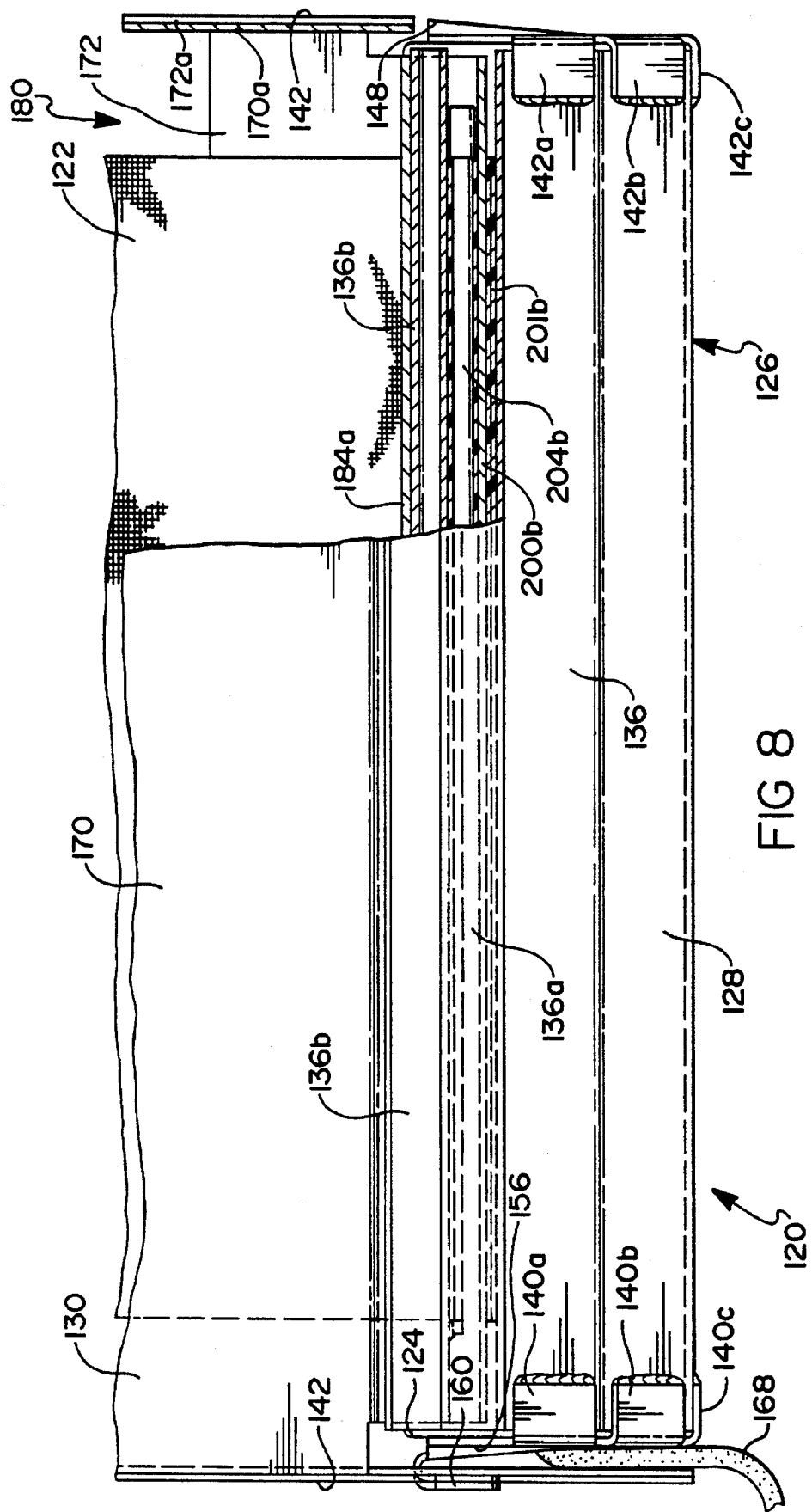
FIG. 8 is a front view of another embodiment of an air bag module according to this invention, partially broken away to show details of construction.

As shown in FIGS. 2 and 7, inflator 24 is a commercially-available gas generating device that includes a cylindrical body 60, of steel or aluminum, having a plurality of gas discharge openings 62. Body 60 has a centrally-mounted mounting lug 64 extending from one end. As best seen in FIG. 3, lug 64 is a doubly flatted cylindrical steel stud that has a diameter sized for reception in mounting aperture 46. The dimension between flats is smaller and is sized to traverse groove 44.

As indicated in FIG. 6, the other end of inflator body 60 incorporates two spaced cylindrical steel mounting studs 66a, 66b which are sized to traverse groove 50 and its branches 50a, 50b. Referring to FIGS. 3, 6 and 7, inflator 24 is mounted in canister 28 as follows.

Inflator 24 is initially positioned above canister 28, with mounting lugs 66a and 66b aligned with groove 50, in a position rotated 90° counterclockwise from the FIG. 6 position. This is 90° clockwise from the FIGS. 3 and 7 positions, with the flats of lug 46 aligned with the sides of groove 44.

Inflator 24 is then inserted into canister 28, with lugs 66a and 66b entering groove 50 and lug 64 entering groove 44. When the lugs bottom out, the inflator 24 is rotated 90° clockwise (FIG. 6), moving lugs 66a and 66b through respective groove branches 50a, 50b and past spring fingers 54a, 54b into mounting apertures 52a, 52b. Rotation also forces the ends of lug 64 against spring fingers 48a, 48b and into contact with shoulders 49a,49b.

Referring now to FIGS. 3–7, deployment chute 30 is an elongated rectangular body comprising side walls 70, 72 and end walls 74, 76, which define a bottom gas transfer opening 78 and a top air bag deployment opening 80. The bottoms of side walls 70 and 72 terminate in inwardly curved elongated flanges 82 and 84 that form troughs and are sized for reception in canister channels 40d and 42d.

As seen in FIG. 7, end wall 76 has a central arcuate cutout 86. Flaps 88 and 90 are integral portions of flanges 82 and 84 that are bent to form end plates for the troughs. Flaps 88 and 90 are spaced below the bottom of end wall 76 by slits large enough to allow sliding passage of canister flanges 40a, 40b and 42a, 42b.

End wall 74 has an arcuate depending portion that includes a cutout 94 that is sized to receive canister protective flanges 56a, 56b. Cutout 94 is flanked by apertures 96a, 96b which are located and sized to receive inflator mounting lugs 56a, 56b. End wall 74 also closes the ends of the troughs of flanges 82 and 84 and includes a pair of inwardly-projecting locking tangs 97a, 97b.

Air bag 22 is made of coated nylon material that is folded to fit within chute 30, as indicated in FIGS. 3–6. Air bag 22 is closed at its upper end by a fabric layer 98 and includes at its bottom end a pair if elongated loops 100a, 100b which are attached to the air bag by webs 101a, 101b and flank a gas receiving air bag opening 102. Installation of inflator 24 to canister 28 was previously described. Installation of the air bag 22 and deployment chute 30 to canister 28 is accomplished as follows.

A pair of elongated steel rods 104a, 104b are inserted into fabric loops 100a, 100b. The loops with rods installed are placed in the troughs of chute flanges 82, 84. Chute 30 is placed endwise of canister 28, with chute end wall 76 adjacent canister end plate 36 and flaps 88, 90 aligned with channels 40d, 42d. Chute 30 is then slid onto canister 28, as flanges 40a, 40b and 42a, 42b slide through the slits atop end flaps 88, 90, trapping chute flanges 82, 84 in channels 40d, 42d between canister flanges 40a, 40b, 42a, 42b and flanges 40c, 42c.

Chute 30 is slid onto canister 28 in this manner until end wall 74 abuts end plate 36 and locking tangs 97a, 97b lock onto the upper outer edges of end wall 36, as shown in FIG. 2. Mounting lugs 66a, 66b are received in apertures 96a, 96b in chute end wall 74. This assembly aligns canister opening 38 with chute opening 78. As chute 30 is slid onto canister 28, the air bag fabric web 101a slides through the gap between the outer edges of canister 42a, 42b and 42c on one side, while web 101b slides through the gap between the outer edges of canister 40a, 40b and 40c on the other side. Rods 104a, 104b and air bag loops 100a, 100b are now confined in closed channels 40d, 42d to mount the lower end of air bag 22 to the now-assembled housing 26.

Inflator 24 includes the usual actuation wiring 106 extending from the double lug end. Upon assembly this wiring 106 extends through canister groove 50 and cutout 94 and is trained downwardly. A plastic protection end cap is then snapped onto protection flanges 56a, 56b to protect the wiring 106 from damage during subsequent handling.

After vehicle installation, actuation of inflator 24 will effect discharge of pressure gas from discharge holes 62. This gas will enter the interior of air bag 22 through aligned openings 38 and 78 to inflate the air bag. The inflating air bag will rapidly unfold and deploy out the top chute opening 80 through an instrument panel opening, not shown in a well-known manner.

Another embodiment of this invention is illustrated in FIGS. 8–12. This embodiment is similar in most respects to the embodiment described above, differing mainly in inflator mounting and some structural details. It is made of stamped steel parts, as will now be described.

An air bag module 120 comprises an air bag 122 and an inflator 124 mounted in a housing 126 which comprises a reaction canister 128 and a deployment chute 130. Canister 128 is formed of an elongated body having an angular U-shaped cross-section including a bottom wall 132. The upper edges of the side walls 134 and 136 of canister 128 are deformed into flanges forming three-sided square channels 134a, 136a and angled terminal rails 134b, 136b. Complementary end plates 140, 142 are crimped, welded or otherwise attached to bottom and side walls 132, 134 and 136 to close the ends of the canister.

Bottom wall 132 includes four integral protrusions 144a, 144b, 144c, 144d lanced upwardly adjacent the end plates for supporting the ends of inflator 124, as later described.

End plate 142 includes a central lug mounting aperture 146 located at the bottom of a groove 148 that tapers inwardly downwardly from the top of end plate 142. Integral wings 142a, 142b, 142c, 142d, 142e are bent into engagement with bottom and side 132, 134 and 136 where they are welded or otherwise attached.

End plate 140 includes two spaced lug mounting apertures 150 and 152, located at the bottoms of respective grooves 154 and 156 that taper inwardly downwardly from the top of end plate 140. A pair of integral locking tabs 158, 160 extend outwardly of end plate 140 from the tops of grooves 154, 156. A wiring slot 161 is located between grooves 154, 156. End plate 140 also includes wings 140a, 140b, 140c, 140d, 140e which are bent into engagement with side and end walls 132, 134 and 136 where they are welded or otherwise attached.

Figure 9:
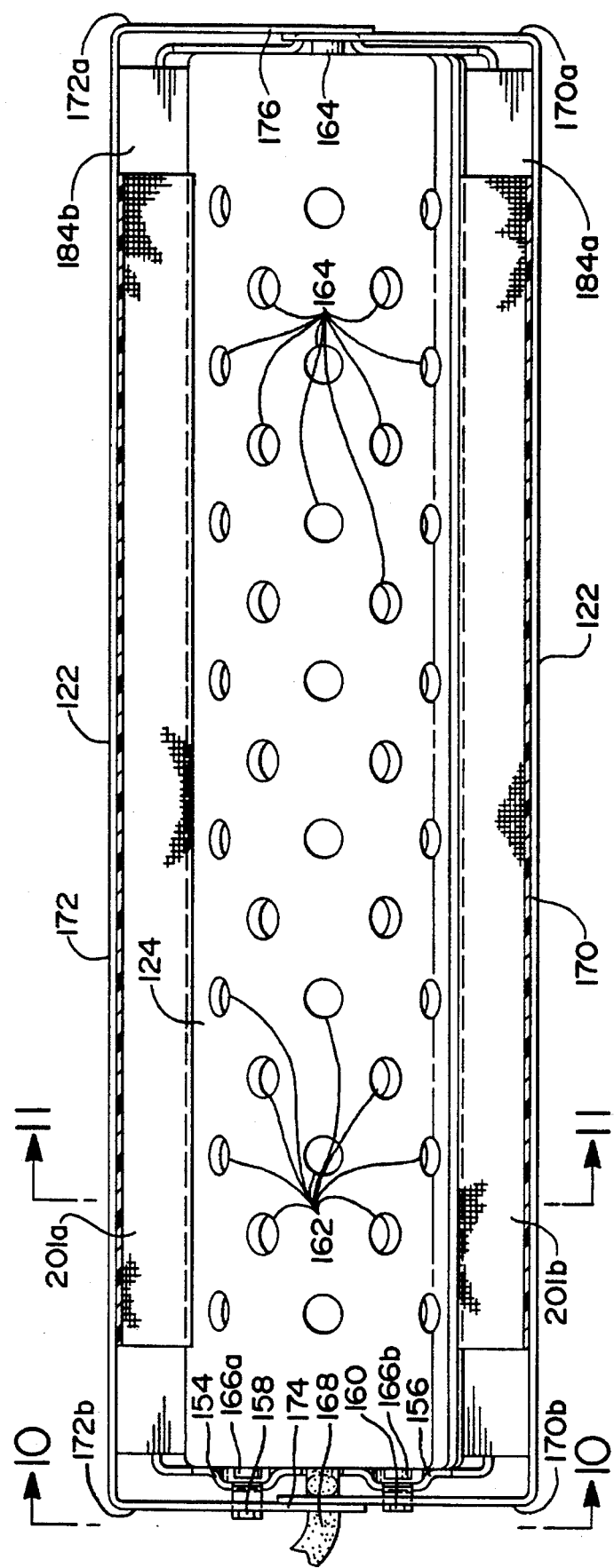
FIG. 9 is a plan view of the air bag module of FIG. 8.

As shown in FIG. 9, inflator 124 is a commercially-available gas generating device, similar to inflator 24, that includes a cylindrical body of steel or aluminum, having a plurality of gas discharge openings 162. Inflator 124 has a centrally-mounted cylindrical mounting lug 164 extending from one end. Lug 164 is sized for reception in mounting aperture 146. As also indicated in FIG. 10, the other end of inflator body 160 incorporates two spaced cylindrical steel mounting studs 166a, 166b which are sized for reception in apertures 150, 152. Inflator 124 includes the usual actuation wiring 168 extending from between lugs 166a, 166b. Referring to FIGS. 8–11, inflator 124 is mounted in canister 128 as follows.

Inflator 124 is initially positioned above canister 128, with mounting lugs 164, 166a and 166b aligned with respective grooves 148, 150 and 152. The inflator is inserted in the canister, as the lugs enter the grooves. The grooves are configured to allow free entry of the lugs, but prevent free passage to the apertures. Since end plates 140, 142 are sheet metal, they are somewhat resilient so that they will bulge outwardly as the lugs 164, 166a and 166b are forced through the grooves. When the lugs enter the apertures, end plates 140 and 142 will spring back, trapping the lugs within the apertures to securely install inflator 124 within canister 128.

In the installed position, the ends of inflator 124 are supported by canister protrusions 144a, 144b, 144c, 144d, as shown in FIGS. 10 and 11. The actuation wiring 168 extends through slot 161 and downwardly between grooves 154, 156.

Referring now to FIGS. 9–12, deployment chute 130 is an elongated rectangular body comprising side walls 170, 172 and end walls 174, 176, which define a bottom gas transfer opening 178 and a top air bag deployment opening 180. The bottoms of side walls 170 and 172 terminate in elongated flanges 182 and 184. Flange 182 comprises an inward, downwardly angled segment 182a, a downward segment 182b and an outwardly and upwardly curved segment 182c which form an elongated trough 182d. Similarly, flange 184 comprises an inward, downwardly angled segment 184a, a downward segment 184b and an outwardly and upwardly curved segment 184c which form an elongated trough 184d. The troughs 182d, 184d are sized for reception in canister channels 134a, 136a.

End wall 174 is formed of portions 170a, 172a of side walls 170, 172 which are bent 90° and welded together. Similarly, end wall 176 is formed of portions 170b, 172b of side walls 170, 172 which are bent 90° and welded together.

Figure 12:
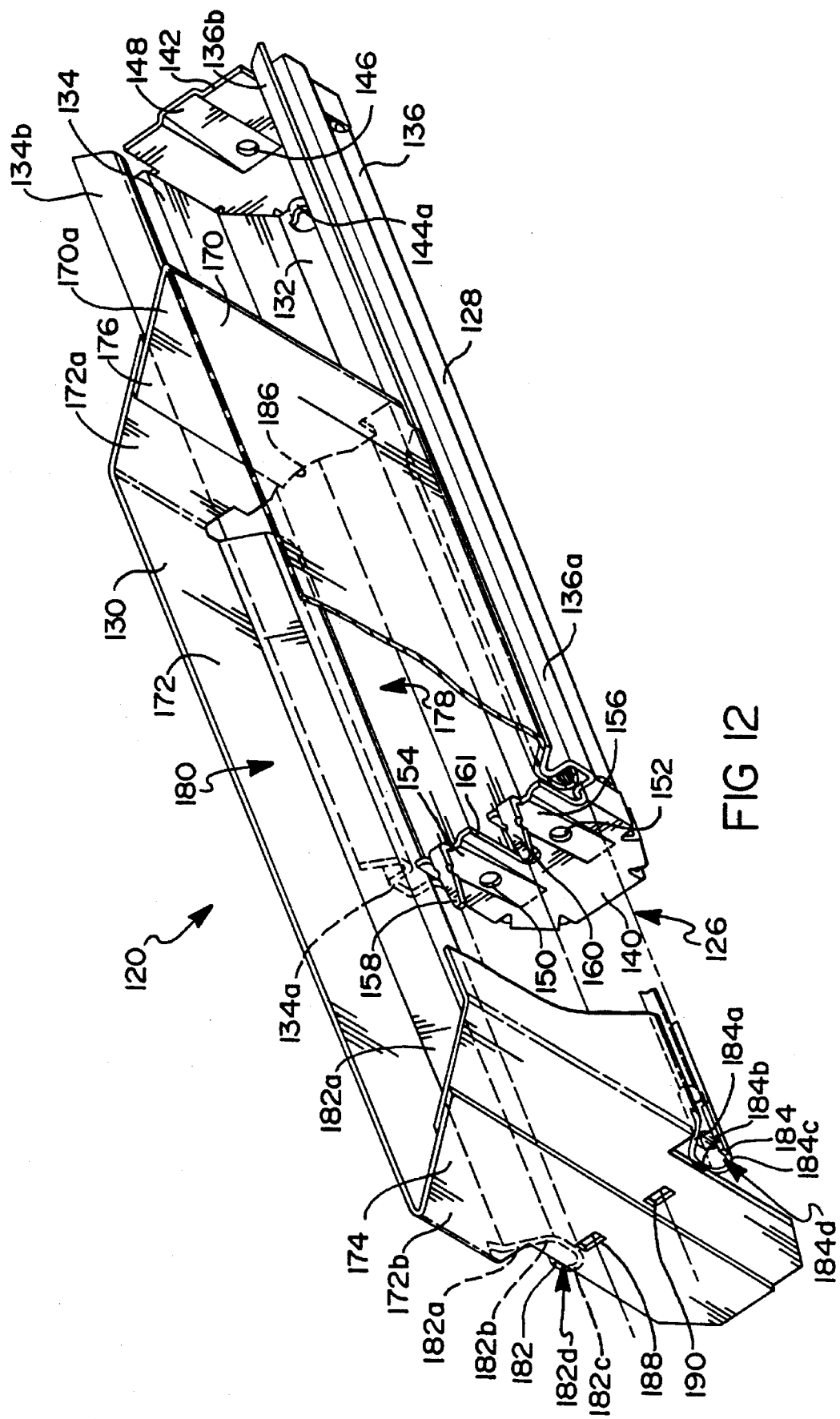
FIG. 12 is a perspective view of the embodiment of FIGS. 9–11, shown during assembly of the air bag deployment chute to the inflator reaction canister, partially broken away to show details of construction.
Figure 13:
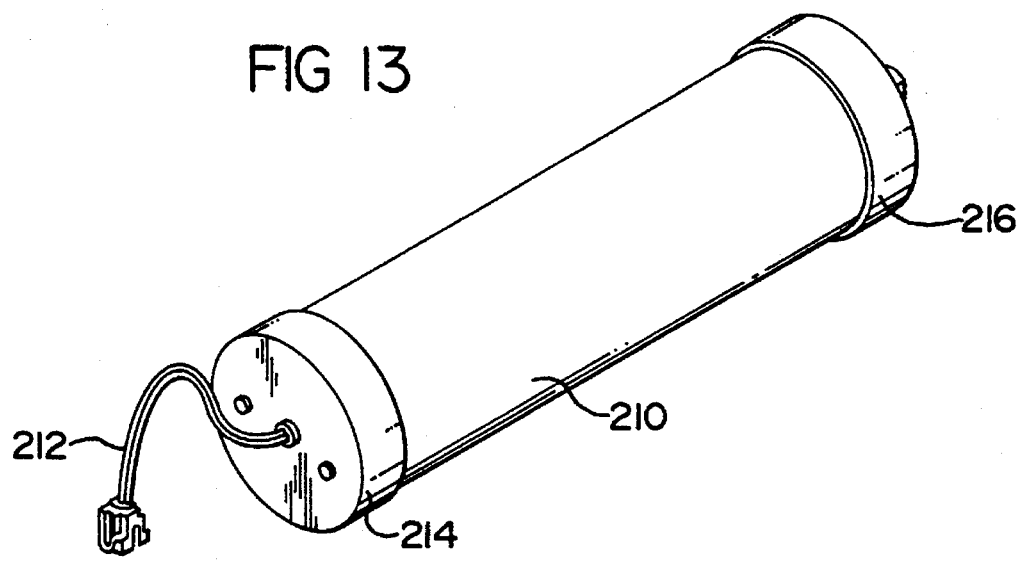
FIG. 13 is a perspective view of an inflator incorporating end cap mounting adapters according to this invention.
Figure 14:
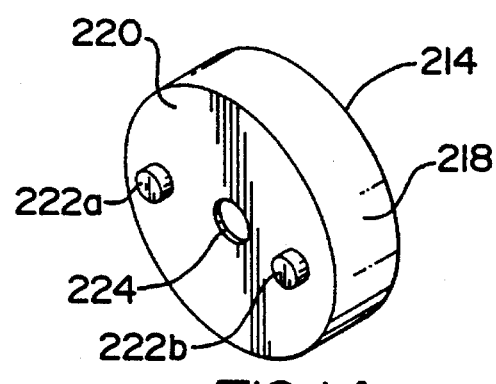
FIG. 14 is an enlarged perspective view of one of the end caps shown in FIG. 13.

End wall 176 has a central arcuate cutout 186 (FIG. 12). End wall 174 has a depending portion that is sized to match canister end plate 140. End wall 174 includes two spaced slots 188, 190 which receive canister locking tabs 158, 160.

As in the previous embodiment, air bag 122 is made of coated nylon material that is folded to fit within chute 130, as indicated in FIGS. 9–11. Air bag 122 is closed at its upper end by a fabric layer 198 and includes at its bottom end a pair of elongated loops 200a, 200b attached to the air bag by elongated webs 201a, 201b. Installation of inflator 124 to canister 128 was previously described. Installation of the air bag 122 and deployment chute 130 to canister 128 is accomplished as follows.

A pair of elongated steel rods 204a, 204b are inserted into fabric loops 200a, 200b. The loops with rods installed are placed into troughs 182d, 184d, with webs 202a, 202b passed under, around and into the troughs 182d, 184d. Chute 130 is placed endwise of canister 128, with chute end wall 176 adjacent canister end plate 140 and troughs 182d, 184d aligned with channels 134a, 136a. Chute 130 is then slid onto canister 128, with chute segments 182a, 184a sliding on canister rails 134b, 136b. Since the chute 130 is supported by segments 182a, 184a on canister rails 134b, 136b, air bag fabric webs 202a, 202b are not abraded during installation.

Chute 130 is slid onto canister 128 in this manner until end wall 174 abuts end plate 140 and locking tabs 158, 160 extend through slots 188, 190. Tabs 158, 160 are then bent into engagement with end wall 174, locking chute 130 to canister 128. The depending portion of chute end wall 174 partially closes the end of troughs 182d, 184d and canister end plate 142 closes the other ends of the troughs and channels to confine rods 204a, 204b and loops 200a, 200b in the assembled container 122. This secures the bottom of air bag 122 against removal during inflation.

In the assembled condition, chute end wall 174 is spaced from canister end plate 140. This spacing is sufficient to protect inflator wiring 168 without pinching it. Wiring 168 is thus protected against damage during subsequent handling. Vehicle installation and subsequent operation are as described above.

FIGS. 13–16 depict adapters for converting commercially available, generic cylindrical inflators having no mounting provisions for mounting in the embodiments of the air bag container as described above. A generic cylindrical inflator 210, having actuation wiring 212 incorporates end cap mounting adapter 214 and 216. End cap 214 can take two forms; in FIG. 14, it comprises a cylindrical collar 214 that embraces the end of the body of inflator 210. A circular end plate 220 includes a centrally-mounted exit opening 224 for wiring 212. A pair of cylindrical mounting studs 222a, 222b flank opening 224.

Figure 15:
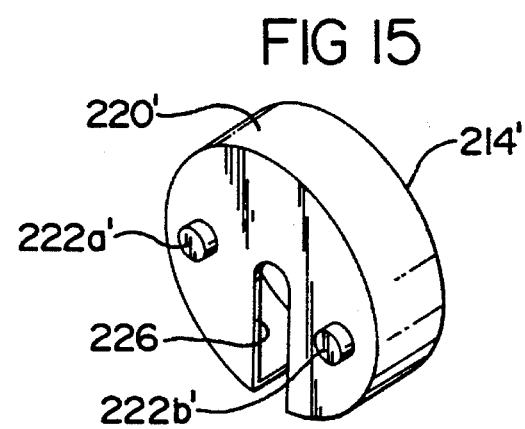
FIG. 15 is a view similar to FIG. 14, illustrating an alternative embodiment of the end cap.
Figure 16:
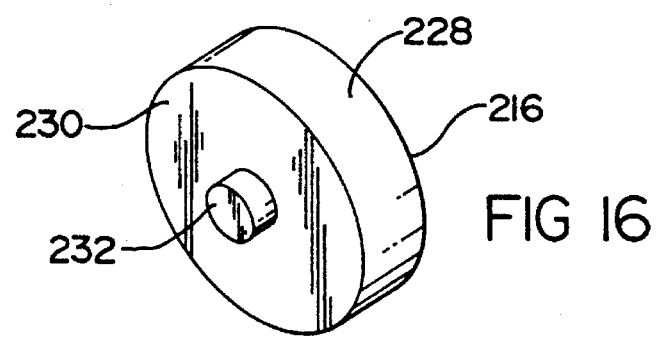
FIG. 16 is an enlarged perspective view of the other end cap shown in FIG. 14.

The FIG. 15 embodiment 214' is similar, but replaces the opening 224 with a radial slot 226 to accommodate wiring 212. This embodiment would be used where space at the inflator end is limited. In FIG. 16, the other end cap 216 includes a cylindrical collar 228 and an end plate 230, which centrally mounts a cylindrical stud 232. This stud could be a flatted stud if used to mount the inflator in the reaction canister 28 described above.

Thus, both embodiments of this invention provide a simplified air bag module which is easily assembled without the use of conventional fasteners, such as screws, bolts or rivets. This is accomplished through the use of interlocking flanges to mount the chute on the canister and form a housing for the inflator and air bag. Also, the air bag is simply mounted through the use of loops on rods that are confined in closed channels, again without the use of conventional fasteners.

The inflator is also easily mounted without the use of conventional fasteners by utilizing mounting lugs captured in apertures when the inflator is inserted into the canister, with or without a final rotation. A conventional inflator is easily adapted to the lug mounting of this invention by providing end caps having the lugs.

While only a preferred embodiment has been illustrated and described, obvious modifications thereof are contemplated within the scope of this invention and the following claims.

We claim:

1. Mounting means for mounting an air bag inflator to a reaction canister having side walls and end walls which define a gas discharge opening, comprising a pair of spaced mounting lugs extending from one end of the inflator, a mounting lug extending from the other end of the inflator, a mounting aperture formed in one end wall, a pair of spaced mounting apertures formed in the other end wall, grooves formed in the end walls extending from an entry at the gas discharge opening to the apertures, said grooves channeling the mounting lugs into the mounting apertures to orient the inflator relative to the container and prevent relative rotation, and spring means on the end walls resisting passage of the lugs into the apertures and thereafter trapping the lugs in the apertures to secure the inflator in the container and prevent removal of the inflator from the container by movement of the lugs out of the apertures through the grooves.

2. The mounting means of claim 1, wherein the end wall grooves are cut through the end walls to allow passage of the mounting lugs therethrough, and the one end wall groove includes a main portion intersected by two spaced arcuate portions for receiving the mounting lugs upon rotation of the inflator, following lug insertion into the groove main portion, and directing the mounting lugs into the apertures.

3. The mounting means of claim 2, wherein the mounting lug extending from said other end of the inflator and the mounting aperture and groove in said other end wall are sized to permit insertion of the lug through the groove into the mounting aperture, but prevent subsequent removal of the lug through the groove after inflator rotation.

4. The mounting means of claim 3, wherein said one end wall includes a spring finger adjacent each aperture for permitting movement of a lug into the aperture, but preventing removal therefrom to prevent reverse rotation of the inflator.

5. The mounting means of claim 1, wherein the end walls adjacent the apertures are spaced apart a distance less than the distance between the ends of the inflator lugs, the grooves at their entries are spaced apart a distance greater than the distance between the ends of the lugs, the grooves taper inwardly from their entries at the gas discharge opening to the apertures, and the end walls adjacent the apertures comprising the spring means.

6. An air bag module comprising an inflatable air bag, an inflator therefor including two spaced mounting lugs extending from one end thereof and a mounting lug extending from the other end thereof, and a container for housing the inflator and the air bag, said container comprising;

a pair of side walls and a pair of end walls, mounting apertures in each end wall for receiving the inflator lugs, opposed grooves in the end walls for simultaneously receiving the inflator lugs and guiding them into the mounting apertures as the inflator is inserted into the container through the gas discharge opening to orient the inflator relative to the container and prevent relative rotation.

7. The module of claim 6, wherein each of the end wall grooves are cut through the end walls to allow passage of the mounting lugs therethrough, and two grooves of the one end wall include a vertical portion intersected by two spaced arcuate portions for receiving the mounting lugs, upon rotation of the inflator following lug insertion into the grooves, and directing the mounting lugs into the apertures.

8. The module of claim 7, wherein the end walls adjacent the apertures are spaced apart a distance less than the distance between the ends of the inflator lugs, the grooves at their entries are spaced apart a distance greater than the distance between the ends of the lugs, the end wall grooves taper inwardly from their entries to the apertures, and the end walls are sufficiently resilient to deflect to enable passage of the lugs through the grooves into the apertures.

9. An air bag module comprising an inflatable air bag, an inflator therefor having a mounting lug extending from one end and two mounting lugs extending from the other end thereof, and a container for housing the inflator and having end walls, said container comprising mating apertures in the end walls for receiving the inflator lugs, opposed grooves in the end walls for simultaneously receiving the inflator lugs and guiding them into the mounting apertures to orient the inflator relative to the container and prevent relative rotation, and spring means on the end walls resisting passage of the lugs into the apertures and thereafter trapping the lugs in the apertures to secure the inflator in the container and prevent removal of the inflator from the container by movement of the lugs out of the apertures through the grooves.

* * * * *